US012276883B2

(12) United States Patent
Morinaga

(10) Patent No.: US 12,276,883 B2
(45) Date of Patent: Apr. 15, 2025

(54) TRANSPARENT BASE MATERIAL FOR LIQUID CRYSTAL DEVICE, LIGHT CONTROL SHEET, AND LIGHT CONTROL DEVICE

(71) Applicant: TOPPAN HOLDINGS INC., Tokyo (JP)

(72) Inventor: Kaori Morinaga, Taito-ku (JP)

(73) Assignee: TOPPAN HOLDINGS INC., Tokyo (JP)

( * ) Notice: Subject to any disclaimer, the term of this patent is extended or adjusted under 35 U.S.C. 154(b) by 0 days.

(21) Appl. No.: 18/748,145

(22) Filed: Jun. 20, 2024

(65) Prior Publication Data

US 2024/0337880 A1 Oct. 10, 2024

Related U.S. Application Data

(63) Continuation of application No. PCT/JP2022/046659, filed on Dec. 19, 2022.

(30) Foreign Application Priority Data

Dec. 21, 2021 (JP) ................................ 2021-207130

(51) Int. Cl.

*G02F 1/1337* (2006.01)
*G02F 1/133* (2006.01)
*G02F 1/1333* (2006.01)
*G02F 1/1343* (2006.01)

(52) U.S. Cl.

CPC .... *G02F 1/133723* (2013.01); *G02F 1/13306* (2013.01); *G02F 1/133305* (2013.01); *G02F 1/13439* (2013.01)

(58) Field of Classification Search

CPC ...... G02F 1/13; G02F 1/13306; G02F 1/1333; G02F 1/133305; G02F 1/1337; G02F 1/133723; G02F 1/13439; G02F 1/1345

See application file for complete search history.

(56) References Cited

U.S. PATENT DOCUMENTS

2015/0205167 A1* 7/2015 Kang ................ G02F 1/133723 445/24

FOREIGN PATENT DOCUMENTS

JP 2017-090508 A 5/2017
JP 2021-140027 A 9/2021

OTHER PUBLICATIONS

International Search Report issued Feb. 7, 2023 in PCT/JP2022/046659, filed Dec. 19, 2022, citing documents 16 therein, 5 pages.

* cited by examiner

*Primary Examiner* — Thoi V Duong

(74) *Attorney, Agent, or Firm* — Oblon, McClelland, Maier & Neustadt, L.L.P.

(57) ABSTRACT

A transparent base material for a liquid crystal device includes an alignment layer that regulates orientations of liquid crystal molecules contained in a light control layer included in the liquid crystal device, a flexible base layer on which the alignment layer is formed, and a first surface and a second surface opposite to the first surface. The first surface is located on the alignment layer, the second surface is located on the base layer, the alignment layer includes polyimide, and the first surface has an indentation hardness of 0.25 GPa or higher as measured by a nanoindentation test according to ISO 14577-1:2015.

12 Claims, 4 Drawing Sheets

FIG.4

| | MANUFACTURING CONDITIONS | | | EVALUATION RESULTS | | | | | | |
|---|---|---|---|---|---|---|---|---|---|---|
| | ALIGNMENT LAYER | | | TRANSPARENT BASE MATERIAL | | | LIGHT CONTROL SHEET | | | |
| | COATING LIQUID | | PROCESS | STRENGTH [GPa] | BLOCKING | | TRANSPARENT STATE (0V) | | OPAQUE STATE (40V) | |
| | POLYAMIC ACID | CROSSLINKING AGENT [%] | KNURLING | | AREA [%] | RATING | NO. OF DEFECTS PER m² | RATING | NO. OF DEFECTS PER m² | RATING |
| EX. 1 | UPIA ST 1001 | 3 | NO | 0.25 | 8 | GOOD | 0 | A | 0 | A |
| EX. 2 | UPIA ST 1001 | 6 | NO | 0.3 | 5 | GOOD | 0 | A | 0 | A |
| EX. 3 | UPIA ST 1001 | 10 | NO | 0.49 | 2 | GOOD | 0 | A | 0 | A |
| EX. 4 | UPIA ST 1001 | 15 | NO | 0.8 | 1 | GOOD | 0 | A | 0 | A |
| EX. 5 | UPIA ST 1001 | 20 | NO | 1 | 0 | GOOD | 1 (CRACKING) | B | 1 (CRACKING) | B |
| EX. 6 | UPIA AT 1001 | 6 | NO | 0.26 | 7 | GOOD | 0 | A | 0 | A |
| COMP. EX.1 | UPIA ST 1001 | 0 | NO | 0.21 | 30 | POOR | 11 (PEELING) | C | 12 (PEELING) | C |
| COMP. EX.2 | UPIA AT 1001 | 0 | NO | 0.18 | 38 | POOR | 20 (PEELING) | C | 19 (PEELING) | C |
| REF. EX.1 | UPIA ST 1001 | 0 | YES | 0.21 | 1 | GOOD | 0 | A | 0 | A |

TRANSPARENT BASE MATERIAL FOR LIQUID CRYSTAL DEVICE, LIGHT CONTROL SHEET, AND LIGHT CONTROL DEVICE

CROSS-REFERENCE TO RELATED APPLICATIONS

The present application is a continuation of and claims the benefit of priority to International Application No. PCT/JP2022/046659, filed Dec. 19, 2022, which is based upon and claims the benefit of priority to Japanese Application No. 2021-207130, filed Dec. 21, 2021. The entire contents of these applications are incorporated herein by reference.

BACKGROUND OF THE INVENTION

Field of the Invention

The present disclosure relates to a transparent base material for a liquid crystal device including an alignment layer, a light control sheet including the transparent base material for a liquid crystal device, and a light control device including the light control sheet.

Description of Background Art

For example, JP 2021-140027 A describes an adhesive layer with a peel strength of a predetermined value or higher. The entire contents of this publication are incorporated herein by reference.

SUMMARY OF THE INVENTION

According to one aspect of the present invention, a transparent base material for a liquid crystal device includes a flexible base layer, and an alignment layer formed on the flexible base layer and formed such that the alignment layer regulates orientations of liquid crystal molecules. The alignment layer includes polyimide and has a surface such that the surface has an indentation hardness of 0.25 GPa or higher as measured by a nanoindentation test according to ISO 14577-1:2015.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a table showing evaluation results of Examples, Comparative Examples, and a Reference Example;

DETAILED DESCRIPTION OF THE EMBODIMENTS

Figure 1:
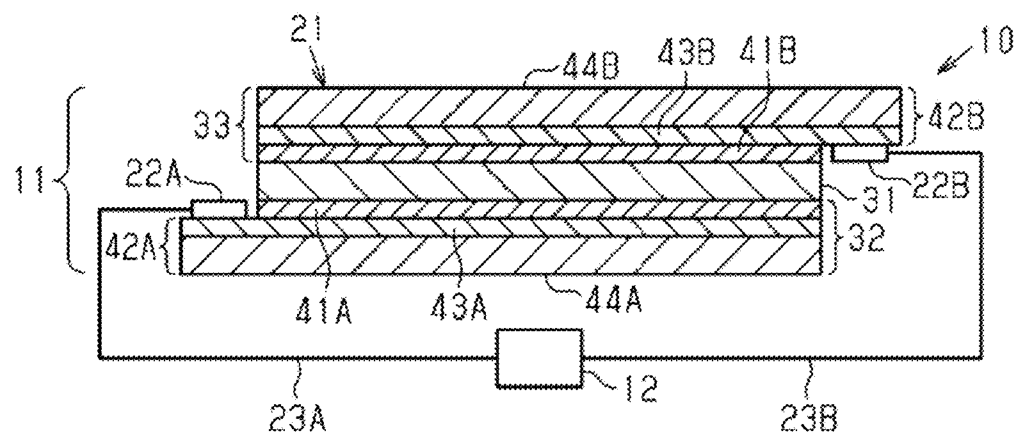
FIG. 1 is a schematic diagram of a light control device.

Embodiments will now be described with reference to the accompanying drawings, wherein like reference numerals designate corresponding or identical elements throughout the various drawings.

Figure 2:
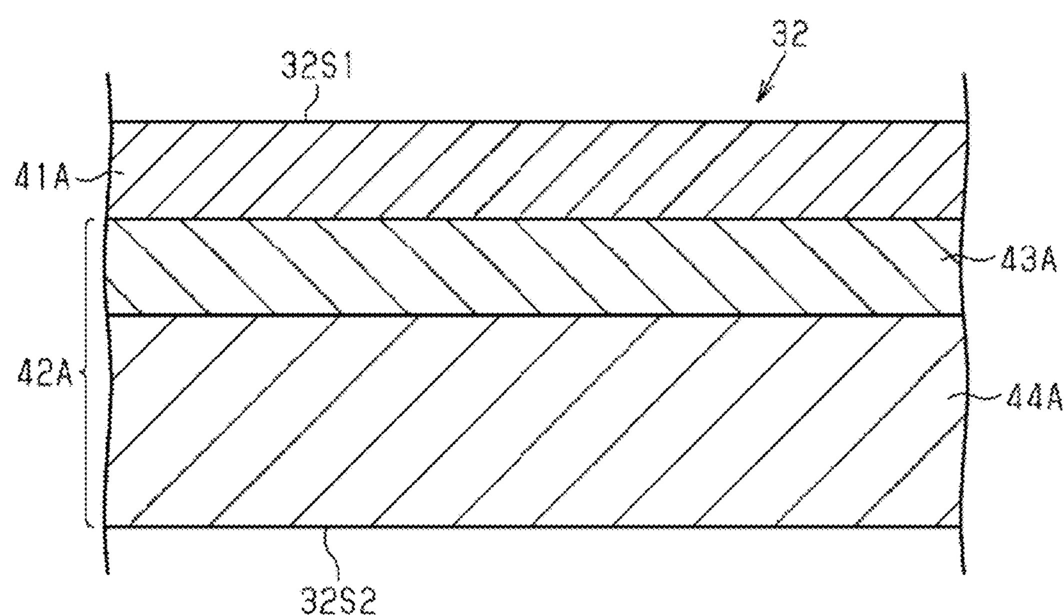
FIG. 2 is a schematic diagram showing a transparent base material for a liquid crystal device.
Figure 3:
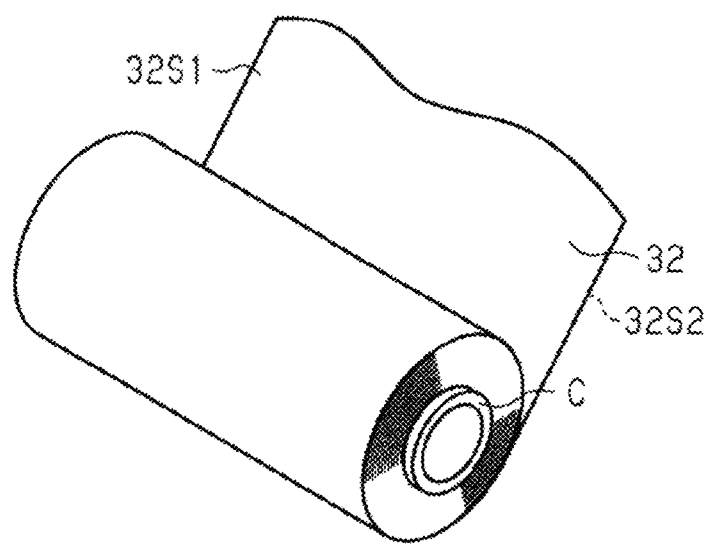
FIG. 3 is a perspective view showing the transparent base material for the liquid crystal device in a rolled-up state.

With reference to FIGS. 1 to 3, an embodiment of a transparent base material for a liquid crystal device, a light control sheet, and a light control device will be described.

Light Control Device and Light Control Sheet

With reference to FIG. 1, the light control device and the light control sheet will be described.

As shown in FIG. 1, a light control device 10, which is an example of a liquid crystal device, includes a light control unit 11 and a drive unit 12. The light control unit 11 includes a reversed-type light control sheet 21. The light control sheet 21 includes a light control layer 31, a first transparent base material 32, and a second transparent base material 33. The first and second transparent base materials 32 and 33 are examples of transparent base materials for liquid crystal devices.

The first transparent base material 32 includes a first alignment layer 41A and a first base layer 42A. The second transparent base material 33 includes a second alignment layer 41B and a second base layer 42B. In the light control sheet 21, the light control layer 31 is sandwiched between the first and second alignment layers 41A and 41B in a thickness direction in which these layers are laminated.

The first and second base layers 42A and 42B are flexible so that they can be wound into a roll. The first base layer 42A includes a first transparent electrode layer 43A and a first transparent support layer 44A. The first transparent electrode layer 43A is located between the first alignment layer 41A and the first transparent support layer 44A in the first transparent base material 32. The second base layer 42B includes a second transparent electrode layer 43B and a second transparent support layer 44B. The second transparent electrode layer 43B is located between the second alignment layer 41B and the second transparent support layer 44B in the second transparent base material 33.

The light control unit 11 includes a first electrode 22A attached to the first transparent electrode layer 43A and a second electrode 22B attached to the second transparent electrode layer 43B. The light control unit 11 also includes a first wiring 23A connected to the first electrode 22A and a second wiring 23B connected to the second electrode 22B. The first electrode 22A is connected to the drive unit 12 via the first wiring 23A. The second electrode 22B is connected to the drive unit 12 via the second wiring 23B.

The first and second electrodes 22A and 22B may be, for example, flexible printed circuits (FPCs). The FPCs include a support layer, a protective layer, and a conductor sandwiched between the support layer and the protective layer. The support layer and the protective layer are made of insulating synthetic resin. For example, the support layer and the protective layer are made of polyimide. The conductor is formed of, for example, a metal thin film. An example of the material of the metal thin film is copper. The first and second electrodes 22A and 22B are not limited to FPCs, and may be, for example, metal tapes.

The first electrode 22A is attached to the first transparent electrode layer 43A by a conductive adhesive layer (not shown). The second electrode 22B is attached to the second transparent electrode layer 43B by a conductive adhesive layer. Each of the first and second electrodes 22A and 22B has a connection part connected to the conductive adhesive layer. At the connection part, the conductor is exposed from the protective layer or support layer. The conductive adhesive layer is formed of, for example, an anisotropic conductive film (ACF), an anisotropic conductive paste (ACP), an isotropic conductive film (ICF), an isotropic conductive paste (ICP), and the like. From the viewpoint of ease of handling in the manufacturing process of the light control device 10, the conductive adhesive layer is preferably an anisotropic conductive film.

The first and second wirings 23A and 23B include, for example, metal wires and an insulating layer covering the metal wires. The wires may be formed of, for example, copper. The insulating layer may be formed of, for example, resin.

The drive unit 12 controls the orientation of the liquid crystal composition by applying an AC voltage between the first and second transparent electrode layers 43A and 43B to generate a potential difference therebetween. The AC voltage applied by the drive unit 12 preferably has a rectangular waveform. The AC voltage applied by the drive unit 12 may also have a shape other than a rectangular waveform. For example, the drive unit 12 may apply a sinusoidal AC voltage between the first and second transparent electrode layers 43A and 43B.

The light control layer 31 includes a transparent resin layer and a liquid crystal composition. The resin layer has voids filled with the liquid crystal composition. The liquid crystal composition is filled in the voids in the resin layer. The liquid crystal composition includes liquid crystal molecules. An example of liquid crystal molecules is at least one selected from those based on Schiff bases, azo types, azoxy types, biphenyls, terphenyls, benzoic acid esters, tolan types, pyrimidines, cyclohexanecarboxylic acid esters, phenylcyclohexanes, and dioxanes.

The type in which the liquid crystal composition is held in the light control layer is selected from a polymer network type, a polymer dispersion type, and a capsule type. The polymer network type has a transparent three-dimensional mesh polymer network and holds the liquid crystal composition in the interconnected voids in the mesh polymer network. The polymer dispersion type has a large number of isolated voids in the resin layer and hold the liquid crystal composition in the voids dispersed in the resin layer. The capsule type holds an encapsulated liquid crystal composition in the resin layer. The liquid crystal composition may contain, in addition to the above-mentioned liquid crystal molecule, a monomer for forming the resin layer, a dichroic dye, and the like.

The light control layer 31 changes the orientation of the liquid crystal molecules according to changes in the voltage between the first and second transparent electrode layers 43A and 43B. Changes in the orientation of liquid crystal molecules change the degree of scattering, absorption, and transmission of visible light entering the light control layer 31. The reversed light control sheet 21 produces a relatively high haze when the light control sheet 21 is energized, that is, when a potential difference is applied between the first and second transparent electrode layer 43A and 43B. The reversed light control sheet 21 has a relatively low haze when the light control sheet 21 is not energized, that is, when a potential difference is not generated between the first and second transparent electrode layer 43A and 43B. For example, the reversed light control sheet 21 has an opaque state when the light control sheet 21 is energized, and a transparent state when the light control sheet 21 is not energized.

For example, the light control sheet 21 may be attached to a window provided to a moving body such as a vehicle or aircraft. The light control sheet 21 can be also attached to, for example, a window of various buildings, such as houses, stations, and airports, partitions in offices, a display window in stores, and a screen onto which images are projected. The shape of the light control sheet 21 may be flat or curved.

Transparent Base Material for Liquid Crystal Device

FIG. 2 shows a cross section of the first transparent base material 32, which is an example of a transparent base material for a liquid crystal device. The second transparent base material 33 has the same layers as the first transparent base material 32. Therefore, while the first transparent base material 32 will be described below, the description of the second transparent base material 33 will be omitted. For convenience of illustration, FIG. 2 schematically illustrates the thickness of each of the layers forming the first transparent base material 32.

As illustrated in FIG. 2, the first transparent base material 32 includes a first surface 32S1 and a second surface 32S2 opposite thereto. The first surface 32S1 is located on the first alignment layer 41A. The first surface 32S1 is in contact with the light control layer 31 when the light control sheet 21 is formed. The second surface 32S2 is located on the first transparent support layer 44A of the first base layer 42A.

The first alignment layer 41A is a vertical alignment film. The first alignment layer 41A regulates the orientation of the liquid crystal molecules so that the long axis of the liquid crystal molecules is perpendicular to the plane in which the first alignment layer 41A lies, that is, the angle formed by the first alignment layer 41A and the long axis of the liquid crystal molecules is a right angle. The angle formed by the first alignment layer 41A and the long axis of the liquid crystal molecules does not need to be exactly a right angle as long as it falls within a range that can be considered to be substantially a right angle. The first alignment layer 41A is made of a polyimide resin. By forming the first alignment layer 41A with a polyimide resin, the thermal stability and chemical stability of the first alignment layer 41A can be improved.

The first alignment layer 41A includes polyimide. Polyimide is formed from its precursor polyamic acid. The first surface 32S1 of the first alignment layer 41A may be subjected to rubbing. The first alignment layer 41A has a thickness of 20 nm or greater and 500 nm or less. The first alignment layer 41A is transparent to visible light.

The first surface 32S1 located on the first alignment layer 41A is a smooth surface that has not been subjected to knurling to form irregularities on the surface of the transparent base material for a liquid crystal device. When the arithmetic mean roughness is measured according to JIS B 0601:2013 is defined as a surface roughness Ra, the first surface 32S1 has a surface roughness Ra of, for example, 10 nm or less.

The first surface 32S1 of the first alignment layer 41A has an indentation hardness of 0.25 GPa or higher. In this embodiment, the indentation hardness is measured by a nanoindentation test. Since the indentation hardness of the first surface 32S1 is 0.25 GPa or higher, the first surface 32S1 conforms less to the fine irregularities on the second surface 32S2 when the first transparent base material 32 is wound into a roll. This reduces the adhesion between the first and second surfaces 32S1 and 32S2 and thus suppresses blocking caused by the first and second surfaces 32S1 and 32S2 sticking together.

The indentation hardness of the first surface 32S1 may be, for example, 0.26 GPa or greater. The indentation hardness of the first surface 32S1 may be, for example, 0.3 GPa or higher. The indentation hardness of the first surface 32S1 may be, for example, 0.4 GPa or higher. The indentation hardness of the first surface 32S1 may be, for example, 0.49 GPa or higher. The indentation hardness of the first surface 32S1 may be, for example, 0.5 GPa or higher. The indentation hardness of the first surface 32S1 may be, for example, 0.6 GPa or higher. The indentation hardness of the first surface 32S1 may be, for example, 0.7 GPa or higher. The indentation hardness of the first surface 32S1 may be, for example, 0.8 GPa or higher. The indentation hardness of the first surface 32S1 may be, for example, 0.9 GPa or higher.

The first surface 32S1 of the first alignment layer 41A has an indentation hardness lower than 1.00 GPa. Since the indentation hardness of the first surface 32S1 is lower than 1.00 GPa, embrittlement of the first alignment layer 41A can be suppressed. This prevents the first alignment layer 41A from cracking when the first transparent base material 32 is wound into a roll.

The indentation hardness of the first surface 32S1 may be, for example, 0.9 GPa or less. The indentation hardness of the first surface 32S1 may be, for example, 0.8 GPa or lower. The indentation hardness of the first surface 32S1 may be, for example, 0.7 GPa or lower. The indentation hardness of the first surface 32S1 may be, for example, 0.6 GPa or lower. The indentation hardness of the first surface 32S1 may be, for example, 0.5 GPa or lower. The indentation hardness of the first surface 32S1 may be, for example, 0.49 GPa or lower. The indentation hardness of the first surface 32S1 may be, for example, 0.4 GPa or lower. The indentation hardness of the first surface 32S1 may be, for example, 0.3 GPa or lower. The indentation hardness of the first surface 32S1 may be, for example, 0.26 GPa or lower.

The "nanoindentation test" used in this embodiment to measure the indentation hardness is based on ISO 14577-1:2015. The indentation hardness is measured by pressing a triangular pyramid-shaped Berkovich indenter into a measurement sample under predetermined conditions. The indentation hardness can be determined by, for example, dividing the maximum indentation load measured when the Berkovich indenter was pressed into the measurement sample to a predetermined indentation depth by the projected contact area obtained from the impression formed on the measurement sample.

The indentation hardness of the first surface 32S1 of the first alignment layer 41A can be controlled by changing the amount of crosslinking agent added to act on the polyamic acid when forming the first alignment layer 41A in the manufacturing process of the first transparent base material 32. When the amount of the crosslinking agent added increases, crosslinking of the polyamic acid is promoted, and the indentation hardness of the first alignment layer 41A increases. When the amount of the crosslinking agent added decreases, crosslinking of the polyamic acid is not promoted, and the indentation hardness of the first alignment layer 41A decreases relatively.

When the sum of the masses of the polyamic acid and the crosslinking agent is assumed to be 100 parts by weight, the amount of the crosslinking agent added is, for example, 3 parts by weight or more and less than 20 parts by weight. The amount of the crosslinking agent added may be, for example, 6 parts by weight or more and less than 20 parts by weight. The amount of the crosslinking agent added may be, for example, 10 parts by weight or more and less than 20 parts by weight. The amount of the crosslinking agent added may be, for example, 15 parts by weight or more and less than 20 parts by weight.

The crosslinking agent acting on polyamic acid may be a crosslinkable compound having two or more substituents of at least one of an epoxy group, an oxetane group, a cyclocarbonate group, a hydroxyl group, or an alkoxyalkyl group; a crosslinkable compound having a polymerizable unsaturated bond; or the like. One crosslinking agent or a combination of two or more crosslinking agents may be used. Specific examples of the crosslinking agent will be listed below, but the crosslinking agent is not limited to these.

Examples of crosslinkable compounds having an epoxy group include bisphenolacetone glycidyl ether, phenol novolac epoxy resin, and cresol novolac epoxy resin. An example of a crosslinkable compound having an oxetane group is 3-ethyl-3-{[(3-ethyloxetan-3-yl)methoxy]methyl}oxetane. Examples of crosslinking compounds having a cyclocarbonate group include 1,3-bis[(2-oxo-1,3-dioxolan-4-yl)methoxy]benzene and 1,3-bis[(2-oxo-1,3-dioxolan-4-yl)methoxy]2-propanol. Examples of crosslinkable compounds having a hydroxyl group include N,N,N',N'-tetrakis(2-hydroxyethyl)adipoamide and 1,3,5-tris(hydroxymethyl)benzene. Examples of crosslinkable compounds having an alkoxyalkyl group include 1,2,4,5-tetramethoxybenzene. Examples of crosslinkable compounds having a polymerizable unsaturated bond include trimethylolpropane tri(meth)acrylate, pentaerythritol tri(meth)acrylate, and dipentaerythritol penta(meth)acrylate.

The material of the first transparent electrode layer 43A may be one of indium tin oxide, fluorine-doped tin oxide, tin oxide, zinc oxide, carbon nanotubes, and poly(3,4-ethylenedioxythiophene). The first transparent electrode layer 43A is transparent to visible light.

The material of the first transparent support layer 44A may be, for example, a synthetic resin or an inorganic compound. Examples of the synthetic resins include polyesters, polyacrylates, polycarbonates, and polyolefins. Examples of polyesters include polyethylene terephthalate and polyethylene naphthalate. Examples of polyacrylates include polymethyl methacrylate. Examples of the inorganic compound include silicon dioxide, silicon oxynitride, and silicon nitride. The first transparent support layer 44A is transparent to visible light. The first transparent support layer 44A does not need to have a single layer structure, and instead it may have a multilayer structure.

The second surface 32S2 of the first transparent support layer 44A is a smooth surface that has not been subjected to knurling to form irregularities on the surface of the transparent base material for a liquid crystal device. When the arithmetic mean roughness measured according to JIS B 0601:2013 is defined as the surface roughness Ra, the second surface 32S2 has a surface roughness Ra of, for example, 20 nm or smaller.

Wound Unit

FIG. 3 illustrates the first transparent base material 32 in a wound state (a wound unit). The second transparent base material 33 can be rolled similarly to the first transparent base material 32. Therefore, while a wound unit of the first transparent base material 32 will be described below, the description of a wound unit of the second transparent base material 33 will be omitted.

As shown in FIG. 3, the first transparent base material 32 is manufactured by roll-to-roll processing. Specifically, the first transparent base material 32 is manufactured by extending a segment of the rolled first base layer 42A (not shown) and forming the first alignment layer 41A on the first transparent electrode layer 43A. Then, the first transparent base material 32 is wound around a core C, which is the core material, to form a wound unit in the form of a roll. For example, in the wound unit state, the first surface 32S1 faces toward the core C serving as the central axis of the wound unit. In this case, the second surface 32S2 faces toward the outer side of the wound unit. The first surface 32S1 is rolled around the second surface 32S2 located on the inner periphery.

When the light control sheet 21 is manufactured by roll-to-roll processing, after setting the rolled first transparent base material 32 on a manufacturing device, the first transparent base material 32 is extended along the longitudinal direction thereof. At this time, if the adhesion between the first and second surfaces 32S1 and 32S2 is too strong, the first and second surfaces 32S1 and 32S2 stick together, making it difficult to separate them, in other words, blocking occurs. If the area of the segment where blocking has occurred is large, the force required to separate the first and second surfaces 32S1 and 32S2 increases. When the force required to separate the first and second surfaces 32S1 and 32S2 exceeds the peeling strength between the first alignment layer 41A and the first transparent electrode layer 43A, the first alignment layer 41A peels off from the first transparent electrode layer 43A. Alternatively, when the force required to separate the first and second surfaces 32S1 and 32S2 exceeds the mechanical strength within the first alignment layer 41A, a portion of the first alignment layer 41A near the first surface 32S1 peels off within the first alignment layer 41A.

In this regard, when the indentation hardness of the first surface 32S1 of the first alignment layer 41A is 0.25 GPa or higher as in this embodiment, the first surface 32S1 conforms less to the fine irregularities on the second surface 32S2. This relatively reduces the adhesion between the first and second surfaces 32S1 and 32S2 and thus suppresses blocking caused by the first and second surfaces 32S1 and 32S2 sticking together.

Conventionally, before rolling the first transparent base material 32 into a roll, pre-processing has been required to suppress blocking. An example of pre-processing for suppressing blocking is knurling for forming irregularities on at least one of the first and second surfaces 32S1 and 32S2. Another example of pre-processing for suppressing blocking is to place a spacer such as a removable tape between the first and second surfaces 32S1 and 32S2 when winding the first transparent base material 32 into a roll. The first transparent base material 32 of this embodiment makes it possible to simplify the manufacturing process of the first transparent base material 32, and in turn the manufacturing process of the light control sheet 21 and the light control device 10 including the first transparent base material 32 as compared with cases where pre-processing is performed on the first transparent base material 32 to suppress blocking.

According to the present embodiment, the advantageous effects listed below can be achieved.

(1) The indentation hardness of the first surface 32S1 measured by a nanoindentation test is 0.25 GPa or higher. Therefore, the first surface 32S1 conforms less to the fine irregularities on the second surface 32S2 when the first transparent base material 32 is wound into a roll. This reduces the adhesion between the first and second surfaces 32S1 and 32S2. As a result, blocking caused by the first and second surfaces 32S1 and 32S2 sticking together in the wound unit state can be suppressed. In addition, it is possible to simplify the manufacturing process of the first transparent base material 32, and in turn the manufacturing process of the light control sheet 21 and the light control device 10 including the first transparent base material 32 as compared with cases where pre-processing is performed on the first transparent base material 32 to suppress blocking.

(2) Since the indentation hardness of the first surface 32S1 measured by a nanoindentation test is lower than 1.00 GPa, embrittlement of the first alignment layer 41A can be suppressed. This prevents the first alignment layer 41A from cracking in the wound unit state.

(3) Even if both the first and second surfaces 32S1 and 32S2 are not knurled, that is, they are smooth surfaces, it is possible to suppress blocking caused by the first and second surfaces 32S1 and 32S2 stick together when the first transparent base material 32 is wound into a roll.

EXAMPLES

Examples, comparative examples, and reference examples will be described with reference to FIGS. 4 to 6. The following examples are examples for explaining the effects of the above embodiment and do not limit the present invention.

Example 1

Production of Transparent Base Material for Liquid Crystal Device

A base layer including a transparent electrode layer made of indium tin oxide and a transparent support layer made of synthetic resin was prepared. A coating liquid for forming an alignment layer was applied onto the transparent electrode layer included in the base layer using a micro gravure coater. Then, the coating liquid was cured to obtain a transparent base material including the alignment layer and the base layer. The alignment layer was formed so as to have a thickness of 150 nm. Then, by winding the transparent base material in-line, a wound unit of the transparent base material wound into a roll was obtained.

The coating liquid for forming the alignment layer is a solution containing polyamic acid, a crosslinking agent, and a diluting solvent. As the polyamic acid, "Upia-ST1001" (manufactured by UBE Corporation, Upia is a registered trademark) was used. "Upia-ST1001" contains 18% by mass of polyamic acid as a solid content in NMP (N-methyl-2-pyrrolidone) as a solvent. As the crosslinking agent, N,N,N',N'-tetrakis(2-hydroxyethyl)adipamide (CAS registry number: 6334-25-4, manufactured by Tokyo Chemical Industry Co., Ltd.) was used. NMP and BCS (butyl cellosolve) were used as diluting solvents.

The amount of the polyamic acid and the amount of the crosslinking agent added were determined so that, when the sum of the masses of the polyamic acid and the crosslinking agent was assumed to be 100 parts by weight, the polyamic acid is 97 parts by weight and the crosslinking agent is 3 parts by weight. In this case, the coating liquid for forming the alignment layer contains 539 parts by weight of "Upia-ST1001" containing 97 parts by weight of polyamic acid and 442 parts by weight of NMP, and 3 parts by weight of N, N, N',N'-tetrakis(2-hydroxyethyl)adipamide. The coating liquid for forming the alignment layer further contains 758 parts by weight of NMP and 1200 parts by weight of BCS as diluting solvents. Therefore, the coating liquid for forming the alignment layer contains 97 parts by weight of polyamic acid, 3 parts by weight of the crosslinking agent, 1200 parts by weight of NMP, and 1200 parts by weight of BCS.

Production of Light Control Device

Next, a light control sheet including a light control layer between a pair of transparent base materials produced as described above was produced. First, a coating liquid for forming the light control layer was applied onto the alignment layer of the transparent base material extended from the wound unit of the first transparent base material. The coating liquid for forming the light control layer contains 50 parts by weight of a resin component, 3 parts by weight of a polymerization initiator, and 47 parts by weight of a liquid crystal component. After that, a segment of the second transparent base material extended from the wound unit of the second transparent base material was placed over the coating liquid for forming the light control layer, and pressure was applied. Then, the coating liquid was cured by irradiating it with ultraviolet light to obtain the light control sheet including the light control layer between the pair of transparent base materials. Further, a light control device was obtained by attaching electrodes and a drive unit to the light control sheet.

Example 2

The transparent base material and the light control device were produced in the same manner as in Example 1, except that the ratio of the components of the coating liquid for forming the alignment layer was different. The coating liquid used in Example 2 to form the alignment layer contains 94 parts by weight of polyamic acid, 6 parts by weight of the crosslinking agent, 1200 parts by weight of NMP, and 1200 parts by weight of BCS.

Example 3

The transparent base material and the light control device were produced in the same manner as in Example 1, except that the ratio of the components of the coating liquid for forming the alignment layer was different. The coating liquid used in Example 3 to form the alignment layer contains 90 parts by weight of polyamic acid, 10 parts by weight of the crosslinking agent, 1200 parts by weight of NMP, and 1200 parts by weight of BCS.

Example 4

The transparent base material and the light control device were produced in the same manner as in Example 1, except that the ratio of the components of the coating liquid for forming the alignment layer was different. The coating liquid used in Example 4 to form the alignment layer contains 85 parts by weight of polyamic acid, 15 parts by weight of the crosslinking agent, 1200 parts by weight of NMP, and 1200 parts by weight of BCS.

Example 5

The transparent base material and the light control device were produced in the same manner as in Example 1, except that the ratio of the components of the coating liquid for forming the alignment layer was different. The coating liquid used in Example 5 to form the alignment layer contains 80 parts by weight of polyamic acid, 20 parts by weight of the crosslinking agent, 1200 parts by weight of NMP, and 1200 parts by weight of BCS.

Example 6

The transparent base material and the light control device were produced in the same manner as in Example 1, except that a polyamic acid "Upia-AT1001" (manufactured by UBE Corporation, Upia is a registered trademark) was used in the coating liquid for forming the alignment layer. "UPIA-AT1001" contains 18% by mass of polyamic acid as a solid content in NMP (N-methyl-2-pyrrolidone) as a solvent. The coating liquid used in Example 6 to form the alignment layer contains 94 parts by weight of polyamic acid, 6 parts by weight of the crosslinking agent, 1200 parts by weight of NMP, and 1200 parts by weight of BCS.

Comparative Example 1

The transparent base material and the light control device were produced in the same manner as in Example 1, except that the coating liquid for forming the alignment layer did not contain a crosslinking agent. The coating liquid used in Comparative Example 1 to form the alignment layer contains 100 parts by weight of polyamic acid, 1200 parts by weight of NMP, and 1200 parts by weight of BCS.

Comparative Example 2

The transparent base material and the light control device were produced in the same manner as in Example 6, except that the coating liquid for forming the alignment layer did not contain a crosslinking agent. The coating liquid used in Comparative Example 2 to form the alignment layer contains 100 parts by weight of polyamic acid, 1200 parts by weight of NMP, and 1200 parts by weight of BCS.

Reference Example 1

After preparing the transparent base material in the same manner as in Comparative Example 1, knurling was performed to form irregularities on the surface of the alignment layer before winding the transparent base material into a roll. After winding the transparent base material into a roll, a light control device was produced in the same manner as in Example 1. In Reference Example 1, the irregularities formed on the surface of the alignment layer by knurling are sufficiently larger than those on the surface of the alignment layer that has not been subjected to knurling. In the transparent base materials of Examples 1 to 6 and Comparative Examples 1 and 2, the alignment layer had a surface roughness Ra of 10 nm or lower. The transparent support layer had a surface roughness Ra of 20 nm or lower.

Test

The following Tests 1 to 3 were conducted on the transparent base materials and light control devices of Examples 1 to 6, Comparative Examples 1 and 2, and Reference Example 1. The evaluation results from the tests are shown in the table of FIG. 4.

Test 1

The indentation hardness of the surface of the alignment layer provided on the transparent base material was measured by a nanoindentation test according to ISO 14577-1:2015. A microhardness tester nanoindenter, "TI Premier" (manufactured by Bruker Japan) was used as the tester. As for the test conditions, a Berkovich indenter was pressed in perpendicularly from the surface of the alignment layer with an indentation depth of 10 nm. The indentation hardness was calculated from the maximum indentation load and the projected contact area.

Test 2

Five pieces of the transparent base material cut into 7 cm square were stacked. A pressure of 5 kg/cm$^2$ was applied using a blocking tester (manufactured by TESTER SANGYO CO., LTD.), and the stack was allowed to stand for 2 hours. Thereafter, the area of the portion in the sample where blocking occurred was measured. When the area of the portion where blocking occurred was less than 10%, the sample was rated as "good", and when it was 10% or more, the sample was rated as "poor". In the case of Reference Example 1, the transparent base material was cut so that at least part of the irregularities formed by knurling were included.

Test 3

In both of the transparent state where no voltage is applied to the light control device and the opaque state where a voltage of 40 V is applied, the number of external defects the light control sheet has per 1 m$^2$ was visually counted. Examples of external defects in light control devices include poor appearance due to peeling of the alignment layer caused by blocking, and poor appearance due to cracks in the alignment layer formed when the transparent base material is wound as a result of embrittlement of the alignment layer. The sample was rated as "A" when the number of external defects in the light control sheet per 1 m$^2$ was less than one, "B" when there was one or more but fewer than five defects, and "C" when there were five or more defects.

Evaluation Result

Figure 5:
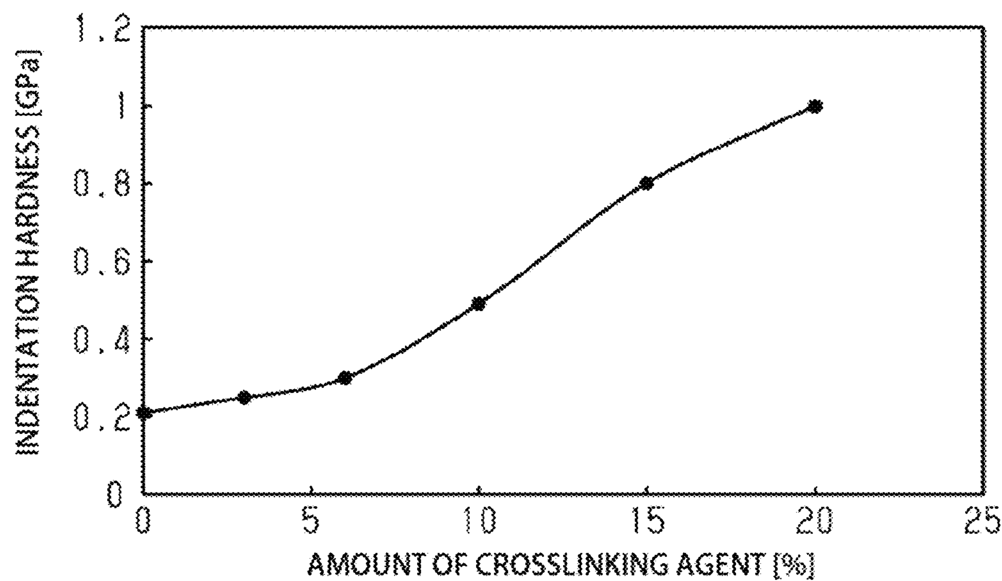
FIG. 5 is a graph showing the relationship between the amount of crosslinking agent added and the indentation hardness of the alignment layer.
Figure 6:
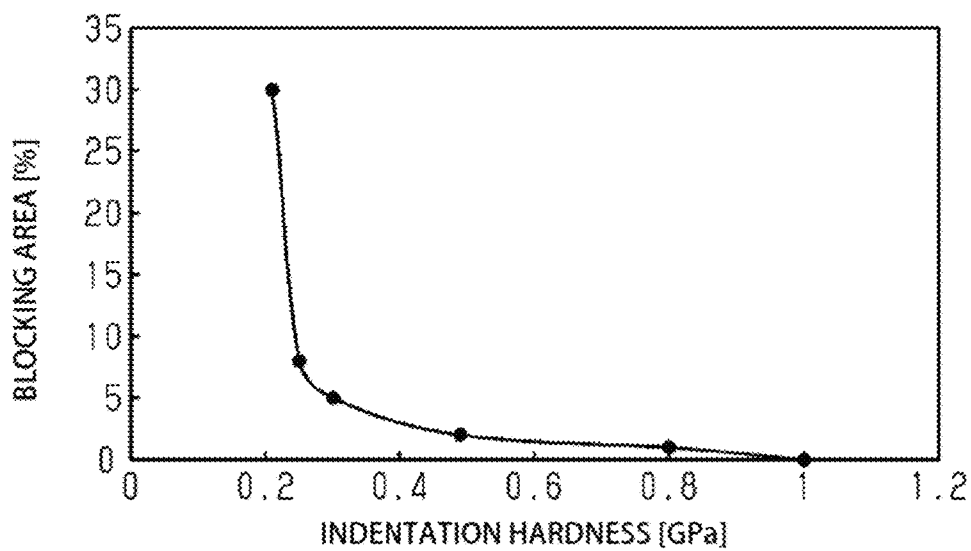
FIG. 6 is a graph showing the relationship between the indentation hardness of the alignment layer and the proportion of the area of the portion where blocking has occurred.

Referring to FIGS. 4 to 6, the evaluation results of Tests 1 to 3 will be described.

Test 1

As shown in FIG. 4, in Examples 1 to 6, the indentation hardness of the alignment layer was 0.25 GPa or higher. Further, in Examples 1 to 4 and Example 6, the indentation hardness of the alignment layer was lower than 1.00 GPa. On the other hand, in Comparative Examples 1 and 2 and Reference Example 1, the indentation hardness of the alignment layer was lower than 0.25 GPa.

The graph shown in FIG. 5 shows the relationship between the amount (%) of crosslinking agent added and the indentation hardness (GPa) of the alignment layer in Examples 1 to 5 and Comparative Example 1. As shown in FIG. 5, the greater the amount of crosslinking agent added, the higher the indentation hardness of the alignment layer. Therefore, it was confirmed that the indentation hardness of the alignment layer can be controlled by changing the amount of crosslinking agent added.

Test 2

Returning to FIG. 4, in Examples 1 to 6 and Reference Example 1, the area of the portion where blocking occurred was less than 10%. With regard to Reference Example 1, it is thought that blocking was suppressed owing to the irregularities on the surface of the alignment layer formed by knurling. On the other hand, in Comparative Examples 1 and 2, the area of the portion where blocking occurred was 10% or higher.

The graph shown in FIG. 6 shows the relationship between the indentation hardness (GPa) of the alignment layer and the proportion (%) of the area of the portion where blocking occurred in Examples 1 to 5 and Comparative Example 1. As shown in FIG. 6, the greater the indentation hardness of the alignment layer, the lower the proportion of the area of the portion where blocking occurred. In particular, when the indentation hardness of the alignment layer increased from 0.2 GPa to 0.25 GPa, the proportion of the area of the portion where blocking occurred decreased significantly.

Test 3

Returning to FIG. 4, in Examples 1 to 4 and Example 6, the light control sheet had less than one external defect per 1 m$^2$ in both the transparent state and the opaque state. In Example 5, the light control sheet had one or more but less than five external defects per 1 m$^2$ in both the transparent state and the opaque state. The external defects confirmed in Example 5 were poor appearance due to cracks in the alignment layer. It is thought that the hardness of the alignment layer of the transparent base material was increased excessively in Example 5, resulting in embrittlement of the alignment layer, and this led to cracks being formed in the alignment layer when the transparent base material was wound into a roll.

On the other hand, in Comparative Examples 1 and 2, the light control sheet had five or more external defects per 1 m$^2$ in both the transparent state and the opaque state. The external defects confirmed in Comparative Examples 1 and 2 were poor appearance due to peeling of the alignment layer. It is thought that, due to the low hardness of the alignment layer in the transparent base materials of Comparative Examples 1 and 2, the alignment layer adhered too tightly to the transparent support layer, and consequently peeled off when the rolled transparent base material was unfold. In Reference Example 1, the number of external defects the light control sheet had per 1 m$^2$ was less than one in both the transparent state and the opaque state.

Modification

The embodiment described above may be modified and implemented as follows.

If the first transparent base material 32 is not subjected to pre-processing for suppressing blocking, the surface roughness Ra of the first surface 32S1 may be higher than 10 nm, and the surface roughness Ra of the second surface 32S2 may be higher than 20 nm. Similar changes can be made to the second transparent base material 33 as well.

If no cracks are formed in the first alignment layer 41A when the first transparent base material 32 is wound into a roll, the indentation hardness of the first surface 32S1 as measured by a nanoindentation test may be 1.00 GPa or higher. For example, cracking may be suppressed by increasing the outer diameter of the core C to increase the minimum bending radius when winding the first transparent base material 32 into a roll. Similar changes can be made to the second transparent base material 33 as well.

Although a first base layer 42A including the first transparent electrode layer 43A and the first transparent support layer 44A is shown as an example, the layered structure of the first base layer 42A is not limited to this. For example, in addition to the first transparent electrode layer 43A and the first transparent support layer 44A, the first base layer 42A may further include a layer having another function.

An example of a reversed-type light control sheet includes a light control layer containing a liquid crystal composition and a pair of transparent base materials sandwiching the light control layer. Each transparent base material includes a transparent support layer, a transparent electrode layer supported by the transparent support layer, and an alignment layer laminated in this order. In the light control sheet, the light control layer and the pair of transparent base materials are laminated such that the light control layer is located between the alignment layers provided on the transparent base materials. In an example of the reversed light control sheet, the alignment layers align liquid crystal molecules vertically when no voltage is applied between the pair of transparent electrode layers. This causes the light control sheet to exhibit relatively low haze. In the reversed light control sheet, the liquid crystal molecules are oriented randomly when voltage is applied between the pair of transparent electrode layers. The incident light is scattered at the interface between the polymer and the liquid crystal so that the light control sheet exhibits a relatively high haze.

The expected expansion of light control sheet applications strongly requires light control sheets having larger areas. Increasing the area of a light control sheet requires new improvements in the resistance of the adhesive layer interposed between the transparent body and the light control sheet. For example, in order to apply large-area light control sheets to window glass or display windows, they are required to have resistance to use under high temperature and high humidity conditions, that is, resistance to a wide range of gases released from the transparent body. As a technique for improving such resistance, it has been proposed to provide the adhesive layer with a peel strength of a predetermined value or higher (see, for example, JP 2021-140027 A). The entire contents of this publication are incorporated herein by reference.

On the other hand, in order to enable mass production of large-area light control sheets, manufacturing by roll-to-roll processing is newly required. The production of light control sheets using the roll-to-roll method also introduces a new problem, namely blocking, in which the orientation layer of the rolled transparent base material and the transparent support layer stick to each other, making it difficult to peel the transparent base materials from each other.

A known example of a technique for suppressing blocking is knurling, which is a process of forming irregularities on one surface of a film. If at least one of the alignment layer and the transparent support layer in the transparent base material is subjected to knurling, the adhesion between the alignment layer and the transparent support layer in the transparent base material wound into a roll will decrease. This facilitates peeling of part of the transparent base material from another.

However, irregularities formed by knurling change the appearance of the light control sheet itself to some extent. In addition, pre-processing or pretreatment for suppressing blocking, such as knurling, increases the number of processes required to manufacture a transparent base material and a light control sheet including the transparent base material. If a blocking suppression technique different from knurling is provided, there will be more options for the appearance of the light control sheet or more options for manufacturing the light control sheet. This may develop industries related to light control sheets.

In one aspect, a transparent base material for a liquid crystal device is provided. The transparent base material for a liquid crystal device includes: an alignment layer that regulates orientations of liquid crystal molecules contained in a light control layer included in the liquid crystal device; a flexible base layer on which the alignment layer is formed; and a first surface and a second surface opposite to the first surface, the first surface is located on the alignment layer, the second surface is located on the base layer, the alignment layer includes polyimide, and the first surface has an indentation hardness of 0.25 GPa or higher as measured by a nanoindentation test according to ISO 14577-1:2015.

In another aspect, a light control sheet is provided. The light control sheet includes: a light control layer containing a liquid crystal composition; and a pair of the above transparent base materials for the liquid crystal devices, the light control layer is sandwiched between the pair of transparent base materials for the liquid crystal devices, and the first surface of each of the transparent base materials for the liquid crystal devices is in contact with the light control layer.

In another aspect, a light control device is provided. The light control device includes: the above light control sheet; and a drive unit for switching the light control sheet between a transparent state and an opaque state, each of the base layers of the pair of transparent base materials for the liquid crystal devices includes a transparent electrode layer, and the drive unit switches the light control sheet between the transparent state and the opaque state by generating a potential difference between the transparent electrode layers to control an orientation of the liquid crystal composition.

Obviously, numerous modifications and variations of the present invention are possible in light of the above teachings. It is therefore to be understood that within the scope of the appended claims, the invention may be practiced otherwise than as specifically described herein.

The invention claimed is:

1. A transparent base material for a liquid crystal device, comprising:

a flexible base layer; and an alignment layer formed on the flexible base layer and formed such that the alignment layer regulates orientations of liquid crystal molecules, wherein the alignment layer includes polyimide and has a surface such that the surface has an indentation hardness of 0.25 GPa or higher as measured by a nanoindentation test according to ISO 14577-1:2015.

2. The transparent base material according to claim 1, wherein the surface of the alignment layer has an indentation hardness lower than 1.00 GPa as measured by a nanoindentation test according to ISO 14577-1:2015.

3. The transparent base material according to claim 2, wherein the surface of the alignment layer has a surface roughness Ra of 10 nm or lower, and the flexible base layer has a surface having a surface roughness Ra of 20 nm or lower.

4. A light control sheet, comprising:

a light control layer comprising a liquid crystal composition; and a plurality of transparent base materials sandwiching the light control layer, wherein each of the transparent base materials comprises the transparent base material of claim 3 such that the surface of each of the transparent base materials is formed in contact with the light control layer.

5. A light control device, comprising:

the light control sheet of claim 4; and a drive unit comprising circuitry configured to switch the light control sheet between a transparent state and an opaque state, wherein the flexible base layer of each of the transparent base materials includes a transparent electrode layer, and the circuitry of the drive unit is configured to switch the light control sheet between the transparent state and the opaque state by generating a potential difference between the transparent electrode layer of a first one of the transparent base materials and the transparent electrode layer of a second one of the transparent base materials such that an orientation of the liquid crystal composition is controlled.

6. A light control sheet, comprising:

a light control layer comprising a liquid crystal composition; and a plurality of transparent base materials sandwiching the light control layer, wherein each of the transparent base materials comprises the transparent base material of claim 2 such that the surface of each of the transparent base materials is formed in contact with the light control layer.

7. A light control device, comprising:

the light control sheet of claim 6; and a drive unit comprising circuitry configured to switch the light control sheet between a transparent state and an opaque state, wherein the flexible base layer of each of the transparent base materials includes a transparent electrode layer, and the circuitry of the drive unit is configured to switch the light control sheet between the transparent state and the opaque state by generating a potential difference between the transparent electrode layer of a first one of the transparent base materials and the transparent electrode layer of a second one of the transparent base materials such that an orientation of the liquid crystal composition is controlled.

8. The transparent base material according to claim 1, wherein the surface of the alignment layer has a surface roughness Ra of 10 nm or lower, and the flexible base layer has a surface having a surface roughness Ra of 20 nm or lower.

9. A light control sheet, comprising:

a light control layer comprising a liquid crystal composition; and a plurality of transparent base materials sandwiching the light control layer, wherein each of the transparent base materials comprises the transparent base material of claim 8 such that the surface of each of the transparent base materials is formed in contact with the light control layer.

10. A light control device, comprising:

the light control sheet of claim 9; and a drive unit comprising circuitry configured to switch the light control sheet between a transparent state and an opaque state, wherein the flexible base layer of each of the transparent base materials includes a transparent electrode layer, and the circuitry of the drive unit is configured to switch the light control sheet between the transparent state and the opaque state by generating a potential difference between the transparent electrode layer of a first one of the transparent base materials and the transparent electrode layer of a second one of the transparent base materials such that an orientation of the liquid crystal composition is controlled.

11. A light control sheet, comprising:

a light control layer comprising a liquid crystal composition; and a plurality of transparent base materials sandwiching the light control layer, wherein each of the transparent base materials comprises the transparent base material of claim 1 such that the surface of each of the transparent base materials is formed in contact with the light control layer.

12. A light control device, comprising:

the light control sheet of claim 11; and a drive unit comprising circuitry configured to switch the light control sheet between a transparent state and an opaque state, wherein the flexible base layer of each of the transparent base materials includes a transparent electrode layer, and the circuitry of the drive unit is configured to switch the light control sheet between the transparent state and the opaque state by generating a potential difference between the transparent electrode layer of a first one of the transparent base materials and the transparent electrode layer of a second one of the transparent base materials such that an orientation of the liquid crystal composition is controlled.

* * * * *